United States Patent [19] [11] 4,008,062
Nishikori et al. [45] Feb. 15, 1977

[54] APPARATUS FOR DETECTING THE POSITION OF FLOAT GLASS

[75] Inventors: Tuneharu Nishikori; Tetsu Mori; Yasuo Kobayashi; Kenjiro Hiyama, all of Aichi, Japan

[73] Assignee: Asahi Glass Co., Ltd., Tokyo, Japan

[22] Filed: Feb. 13, 1976

[21] Appl. No.: 658,017

Related U.S. Application Data

[63] Continuation of Ser. No. 519,292, Oct. 30, 1974, abandoned.

[30] Foreign Application Priority Data

Oct. 30, 1973 Japan ............................ 48-121202

[52] U.S. Cl. .................................. 65/158; 65/99 A; 65/182 R
[51] Int. Cl.² ........................................ C03B 18/02
[58] Field of Search ...... 65/29, 65 A, 99 A, 182 R, 65/158

[56] References Cited

UNITED STATES PATENTS 3,482,954  12/1969  Yuen ................................ 65/99 A
3,794,477   2/1974  Farabaugh et al. .......... 65/182 R X Primary Examiner—Arthur D. Kellogg
Attorney, Agent, or Firm—Oblon, Fisher, Spivak, McClelland & Maier

[57] ABSTRACT

For accurately detecting the position of an edge of a glass ribbon in a process for manufacturing float glass, wherein the glass ribbon is moved forwardly along a longitudinal bath of molten metal, a radiation receiving edge of a radiation pyrometer is inserted transversely of the glass ribbon and thereabove from the side wall of the tank supporting the molten metal bath. The radiation receiving edge is reciprocally moved so as to detect the position at which the indication of a predetermined temperature changes, or the position where the temperature increases rapidly, and the position of the edge of the glass ribbon is detected by measuring such position of the radiation receiving edge where the temperature indicated increases rapidly.

2 Claims, 5 Drawing Figures

APPARATUS FOR DETECTING THE POSITION OF FLOAT GLASS

This is a continuation, of application Ser. No. 519,292, filed Oct. 30, 1974 now abandoned.

BACKGROUND OF THE INVENTION

1. Field of the Invention:

The present invention relates generally to a method of detecting the position of the edge of a glass ribbon being advanced on a bath of molten metal in a continuous process for manufacturing a float glass according to the well known float process, and to an apparatus for performing such method.

2. Description of the Prior Art:

In the known process for manufacturing a float glass which is commonly referred to as a float process, the glass is moved forwardly on the surface of a bath of molten metal in a ribbon form, and the glass is made flat while being advanced therein. The bath of molten metal is usually composed of tin or tin alloy and is contained in a long and narrow tank made of a refractory material. In order to prevent oxidation of the molten metal, a protective atmosphere composed of a non-oxidative gas, such as nitrogen containing a small amount of hydrogen, is maintained in the upper space of the bath container or tank. In such float methods, the molten glass being sustained at high temperature is thus continuously fed from a forehearth connected to a glass melting furnace and is advanced in a ribbon form along the bath of molten metal so as to process a flat and smooth and parallel surface, and then the glass ribbon is taken up from the bath and cooled.

In the operation of such a float process, it is quite important to be able to accurately determine the position of the advancing glass ribbon on the bath of molten metal within the tank. Especially when the molten glass is being fed around the hot end of the bath of molten metal and is being spread in its ribbon form, it is quite important to accurately determine the position of the edge of the glass ribbon, in order to accurately control the flow of the molten glass, to maintain the quality of the glass ribbon on the bath of molten metal and to maintain a stable operation. Heretofore, such detection of the position of the edge of the float glass ribbon has been performed by observing it through an industrial television or directly from a watching window in the tank of the bath of molten metal. However, the accuracy of such detection depends upon the experience and ability of the operator, and different positions may be detected by different observers. It has also been proposed to inject a gas from a nozzle against the edge of the glass ribbon and to measure the back pressure to more accurately detect the positions of the glass edge. In this method, however, the edge of the glass ribbon is cooled by the gas and molten metal is blown on the surface of the glass ribbon, so as to cause the disadvantages of distortion thereon and surface stains.

SUMMARY OF THE INVENTION

It is an object therefore of the present invention to provide an improved method and apparatus for detecting the position of the edge of a float glass ribbon being advanced on a molten bath within a tank which avoids the disadvantages heretofore encountered by the known methods.

It has been found that when the temperature of the glass ribbon and the temperature of the molten bath contacted with the glass ribbon are measured by a thermometer for measuring a temperature of the material by receiving radiation from the material at a high temperature, such as a radiation pyrometer, an apparent temperature difference is detected as between 200° - 400° C, even though a true temperature difference is only about 100° C. The reason is considered to be based on the difference of the emissive power of blackness of the molten tin and the glass at such high temperatures.

The foregoing object of the present invention and others as well have been attained by providing a method of detecting the position of the edge of the glass ribbon in a process for manufacturing float glass wherein the glass in a ribbon form is moved forwardly along the bath of molten metal which is characterized by inserting a radiation receiving edge of a radiation pyrometer mounted on a supporting rod above the glass ribbon in a direction transverse to the glass ribbon, and reciprocably moving the radiation receiving edge according to the detection of a predetermined temperature so as to track the position wherein the temperature indicated by the radiation pyrometer increases rapidly, and measuring this position of the radiation receiving edge as being the edge of the glass ribbon.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several figures and in which.

DETAILED DESCRIPTION OF THE PREFERRED EMBODIMENTS

Figure 1:
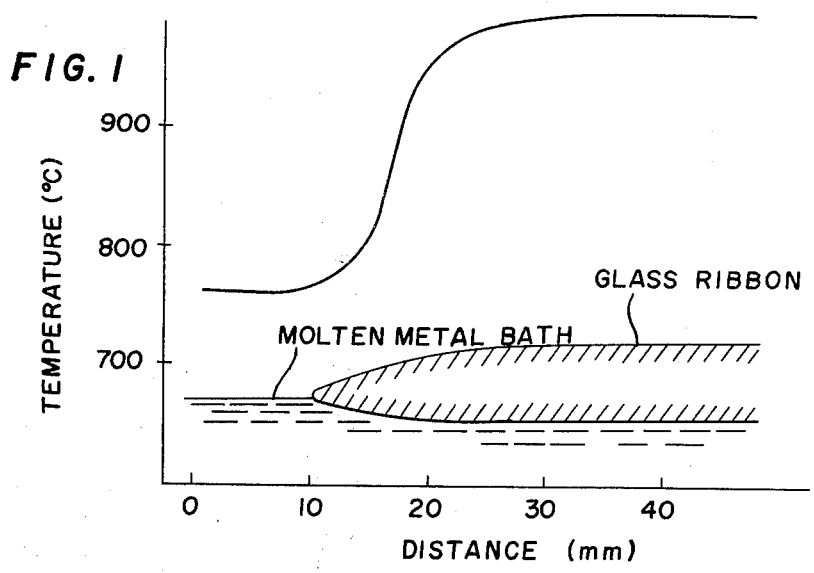
FIG. 1 is a graph illustrating a phenomenon of the background of the invention.

Referring now to the drawings, and more particularly to the graph shown in FIG. 1, the ordinate shows temperature indicated by a radiation pyrometer and the abscissa shows the length of the both of molten metal in a transverse direction thereof. In FIG. 1, a sectional view of the glass ribbon is shown, so as to show the position of one edge of the glass ribbon floating on the bath. The curve of FIG. 1 is one example of the temperatures indicated by the radiation pyrometer with regard to the length of the bath of molten metal measured in a transverse direction thereof. In the embodiment, the indicated temperature at the part of the bath of molten metal not covered by a floating glass ribbon is about 765° C; the indicated temperature at the edge of the glass ribbon is 770° C, and the indicated temperature rapidly increases from this position to give about 900° C for about the next 20 mm from the edge to the center of the glass ribbon, throughout which it is kept substantially the same. The absolute value of the indicated temperature may fluctuate, but the relation between the indicated temperature and the distance from the edge of the glass ribbon is relatively constant. For example, in FIG. 1, when the edge of the radiation pyrometer is set so as to detect the position at which a temperature of 900° C is detected, the position approached at about 8 mm, from the edge of the side of the tank is detected. The value of 8 mm is constant, and accordingly, the position of the edge of the glass ribbon can be relatively maintained.

Figure 2:
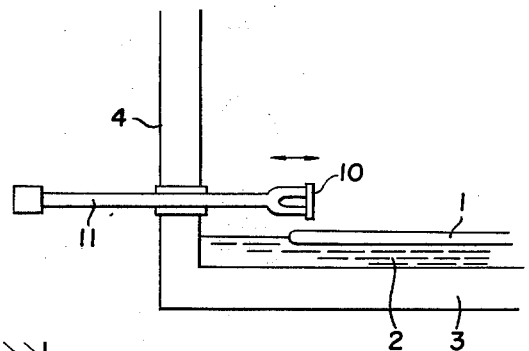
FIG. 2 is a schematic view of a part of one embodiment of the present invention illustrating the method thereof.

Referring now to FIG. 2, a glass ribbon 1 is shown floating on a bath 2 of molten metal within a tank having a bottom wall 3 and a vertical side wall 4. A radiation receiving edge 10 of a radiation pyrometer comprises an object lens, a heat receiving plate and a radiation emitter for measuring the temperature rise of the heat receiving plate, such as a thermocouple. A supporting rod 11, in which a leading wire for transmitting the measured temperature from the radiation emitter to a meter in the form of an electrical signal, a gas pipe for purging with an inert gas, such as nitrogen gas, for preventing the clouding of the object lens and a water cooling pipe are held, movably supports the pyrometer for movement transversely of the floating glass ribbon.

The radiation receiving edge 10 and the supporting rod 11 therefore are reciprocably moved in the transverse direction of the floating glass ribbon, a driving means being used for tracking the radiation receiving edge 10 so as to give the position wherein the indication of a predetermined temperature changes which is the position where an apparent temperature of the glass and the molten metal indicated by the radiation pyrometer increases rapidly.

Figure 3:
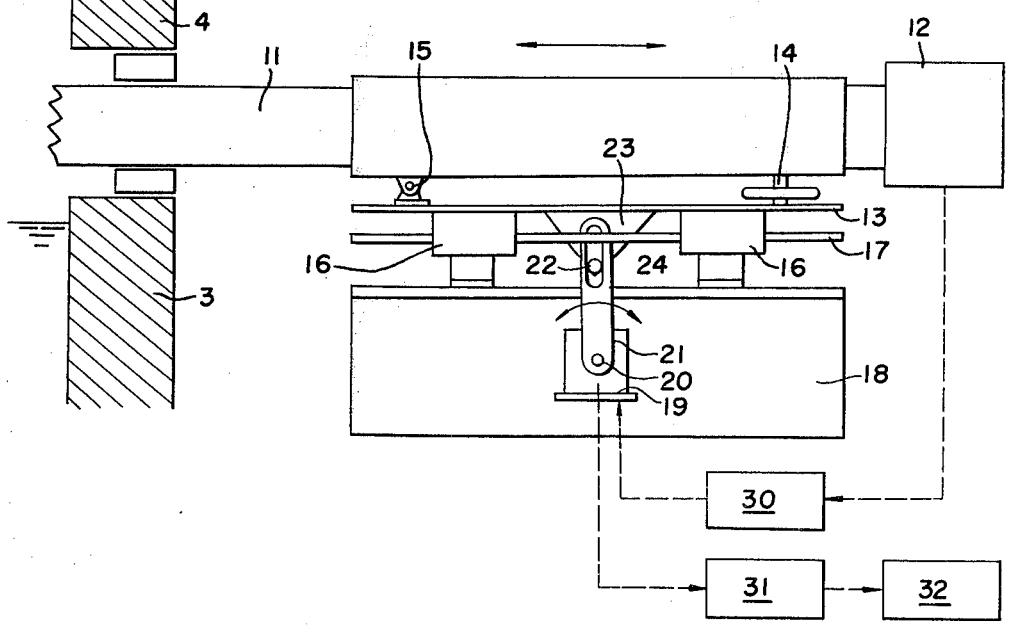
FIG. 3 is a schematic plan view of one embodiment according to the invention.
Figure 4:
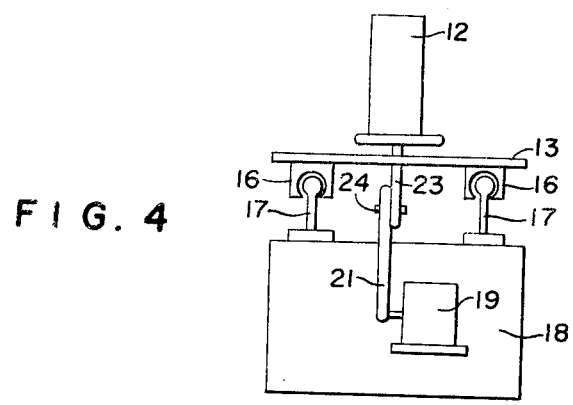
FIG. 4 is a schematic side view of the embodiment shown in FIG. 3.

In FIGS. 3 and 4, an embodiment of the driving means is shown, in which the rear part 12 of the supporting rod 11, with which the radiation receiving edge, not shown, is equipped, holds the leading wire, the pipe for feeding the purging gas, and the connection of the cooling water pipe. The supporting rod 11 is mounted on a base plate 13 with a pivot 15 at its forward end and a screw 14 at its rear end having a vertical adjusting handle for elevating the rear end. Four sliding elements 16 are disposed on the lower surface of the base plate 13, each having a groove therein for slidably receiving one of a pair of guide rails 17 disposed above a supporting bed 18. A control motor 19 is disposed on the supporting bed 18.

A generally upright rotary arm 21 is fixed to a rotary shaft 20 of the motor 19 and an elongate slot 22 is formed at the upper edge of the rotary arm. A projection 24 formed on a bracket 23 mounted on the lower surface of the base plate 13 is freely fitted within the elongate slot 22. Accordingly, the rotary arm 21 fixed to the rotary shaft 20 when rotated by the operation of the control motor 19 will move rod 11 forwardly or backwardly.

An embodiment of the drive control system of the control motor 19 will now be described. In this embodiment, the control motor 19 is controlled by a motor driving circuit 30, so as to reciprocably move the rod 11. When the radiation receiving edge 10 approaches the edge of the glass ribbon in its forward movement, the indicated temperature rises, as shown in FIG. 1. A temperature switch or relay for stopping the rotation of the motor at the time the radiation receiving edge detects a predetermined indicated temperature is connected in the circuit, whereby the rotation of the motor is stopped at a given position, such as the position showing 850° C of indicated temperature. The position is read by a potentiometer 31 and is indicated by an indicator 32. The motor is switched then to the backward movement after a certain period set by a timer from when the motor was stopped. When the radiation receiving edge continues to move backwardly, a limit switch equipped with the back of the guide rail is actuated to switch again to the forward movement. Thus, the reciprocal movement is repeated. The signal for indicating the position is intermittently given.

Figure 5:
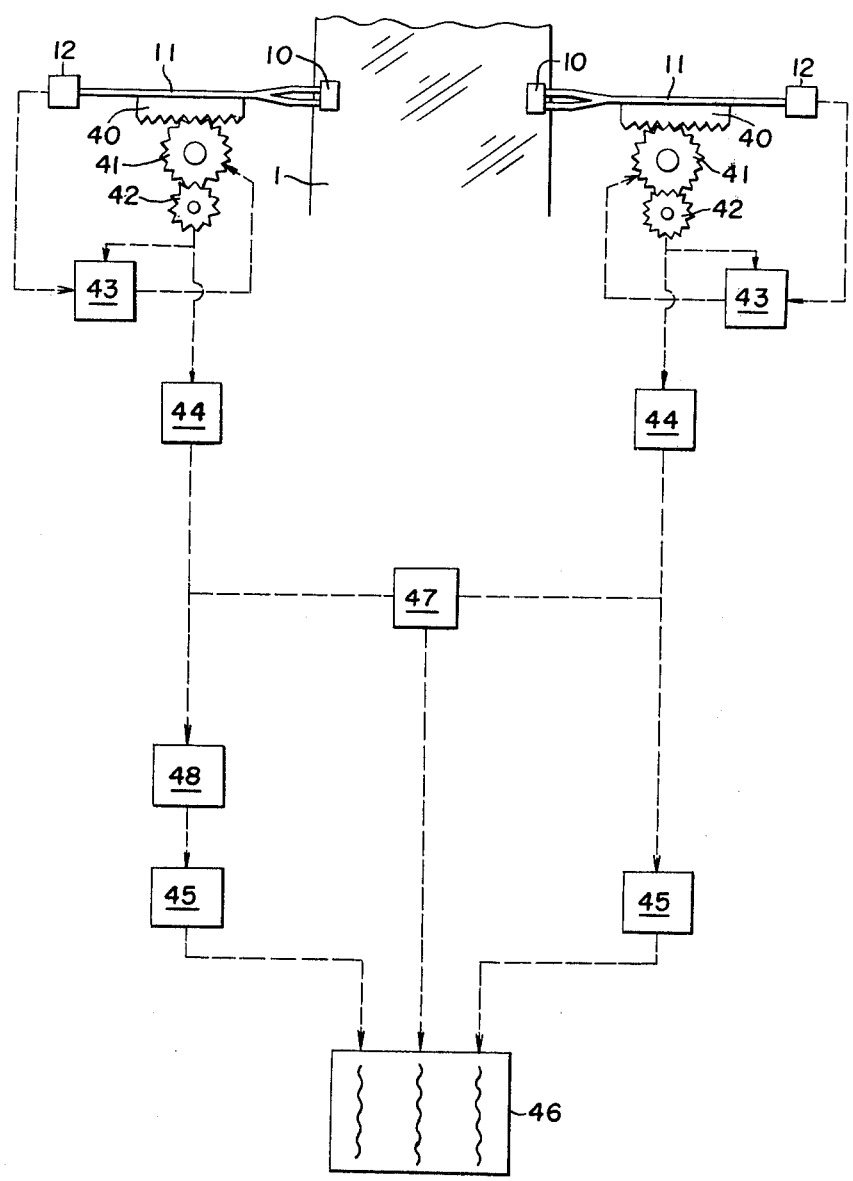
FIG. 5 is a schematic view of another embodiment according to the present invention.

Another embodiment for continuously measuring the position of the edge of the glass ribbon is shown in FIG. 5, wherein a rack 40 is mounted on the supporting rod 11, and is interlocked with the gear 41 of the control motor. The radiation receiving edge 10 is again forwardly or backwardly moved by rotation of the control motor. The information regarding the position of the radiation receiving edge 10 is given through a gear 42 of the potentiometer interlocked with the gear 41 of the control motor. The information of temperature is given from the radiation emitter disposed at the radiation receiving edge 10 through the terminal 12 to an electronic temperature controller 43 in the form of voltage.

In the electronic temperature controller 43, the setting index is set at the predetermined temperature for the position where the temperature indicated by the radiation pyrometer increases rapidly. The radiation receiving edge is reciprocably moved to track the position corresponding to the predetermined temperature by applying the instruction to the control motor by the electronic temperature controller so as to move backwardly when the temperature indicated by the radiation pyrometer is higher than the predetermined temperature and to move forwardly when the indicated temperature is lower than the predetermined temperature. The electronic temperature controller 43 controls the rotation of the control motor by the PID control action. The information of the position of the radiation receiving edge 10 on the right side of the bath, as seen in FIG. 5, is given as an electrical resistance from the potentiometer to a potentio-voltage converter 44, wherein it is converted to a voltage signal and the voltage signal is applied to a ratio bias 45 wherein it is proportionally converted to a value of one half and then is recorded on the right part of the chart of a recorder 46. On the other hand, the information of the position of the radiation receiving edge on the left side is given through a potentio-voltage converter 44 to a signal reverser 48, wherein it is reversed and then is recorded through a ratio bias 45 to the left part of the chart of the recorder 46. The values corresponding to the width of the glass ribbon are given from the right and left potentio-voltage converters 44 to a computer 47 and are there computed, and the value is recorded at the center of the chart of the recorder 46.

Thus, in accordance with the present invention, the positions of the edges of the floating glass ribbon and the width thereof can be accurately measured and the amount of molten glass fed to the bath of molten metal can thus be automatically and effectively controlled.

Obviously, numerous modifications and variations of the present invention are possible in light of the foregoing. It is therefore to be understood that within the scope of the appended claims, the invention may be practiced otherwise than as specifically described herein.

What is claimed as new and desired to be secured by letters patent of the United States is:

1. An apparatus for detecting the position of an edge of a glass ribbon being forwardly moved on a bath of molten metal in an elongate tank in a process for manufacturing a float glass, comprising:
   a reciprocably movable radiation receiving edge of a radiation pyrometer being disposed for movement transversely above said floating glass ribbon,
   a control motor for reciprocably moving said radiation receiving edge of said pyrometer, having a gear interlocked with a rack mounted on said supporting rod;
   an electronic temperature controller, having means for receiving temperature information from said radiation receiving edge and a setting index set at a predetermined temperature in the temperature range where apparent temperatures indicated by said radiation pyrometer increases rapidly, for controlling the rotation of said control motor so as to move the radiation receiving edge backwardly when the temperature indicated by said radiation pyrometer is higher than said predetermined temperature and to move said radiation edge forwardly when the indicated temperature is lower than said predetermined temperature; and
   potentiometer means for indicating the position of said radiation receiving edge in said transverse movement as a measure of the position of the edge of the floating glass ribbon, said potentiometer having a gear interlock with the gear of said control motor.

2. An apparatus according to claim 1, further comprising:
   a potentio-voltage converter for converting information of the position of said radiation receiving edge to a voltage signal; and
   a recorder for recording said voltage signal.

* * * * *